United States Patent [19]

Bantz et al.

[11] 4,376,982

[45] Mar. 15, 1983

[54] PROTOCOL FOR INTER-PROCESSOR DIALOG OVER A COMMUNICATION NETWORK

[75] Inventors: David F. Bantz, Chappaqua, N.Y.; Michel F. Choquet, Saint Donat, France; Jack L. Rosenfeld, Ossining, N.Y.

[73] Assignee: International Business Machines Corporation, Armonk, N.Y.

[21] Appl. No.: 164,422

[22] Filed: Jun. 30, 1980

[51] Int. Cl.³ .............................................. G06F 3/04
[52] U.S. Cl. .................................... 364/900; 364/200
[58] Field of Search ... 364/200 MS File, 900 MS File

[56] References Cited

U.S. PATENT DOCUMENTS

| | | | |
|---|---|---|---|
| 3,680,053 | 7/1972 | Cotton et al. | 364/200 |
| 4,047,162 | 9/1977 | Dorey et al. | 364/200 |
| 4,071,908 | 1/1978 | Brophy et al. | 364/900 |
| 4,106,104 | 8/1978 | Nitta et al. | 364/900 |
| 4,149,238 | 4/1979 | James et al. | 364/200 |
| 4,195,351 | 3/1980 | Barner et al. | 364/900 |
| 4,225,919 | 9/1980 | Kyu et al. | 364/200 |
| 4,231,086 | 10/1980 | Tarbox et al. | 364/200 |

*Primary Examiner*—Joseph F. Ruggiero
*Assistant Examiner*—Gary V. Harkcom
*Attorney, Agent, or Firm*—Robert W. Berray

[57] ABSTRACT

A communication system includes a plurality of requestors and a plurality of responders representing resources. A protocol exercised by all elements provides accurate and consistent interconnection of all elements in a system where messages may be delayed or lost. Requestors are provided with means to transmit a request for use of a plurality of resources, respond to acceptances from one or more responders and create a cooperative relationship by transmitting a confirmation to one responder and cancellation of the request to all other responders. Responders become committed to a requestor by signalling an acceptance to a request if a previous acceptance has not been transmitted, or if the resource is not already committed to another requestor, and a subsequent confirmation signal is received. The responder does not become committed after transmitting an acceptance if the next signal directed to it from the requestor is a request cancellation. Request signals and cancellation signals by a requestor can either be broadcast simultaneously to all responders of a class or transmitted to particular, designated responders, one at a time.

6 Claims, 16 Drawing Figures

FIG. 11 OUTPUT GATING

FIG. 15 STATE FLIP FLOPS
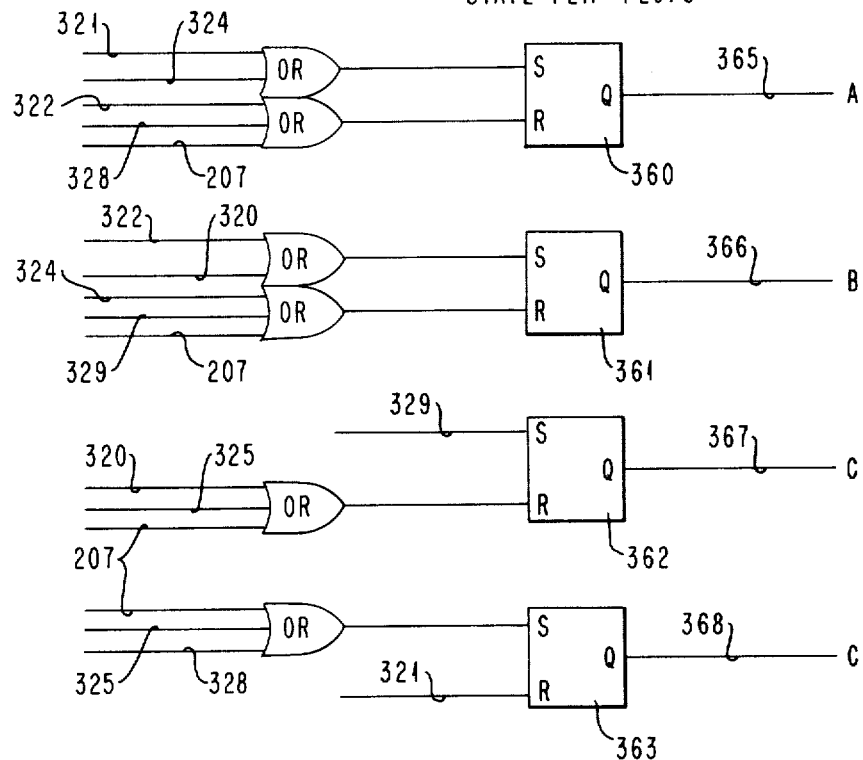
FIG. 16
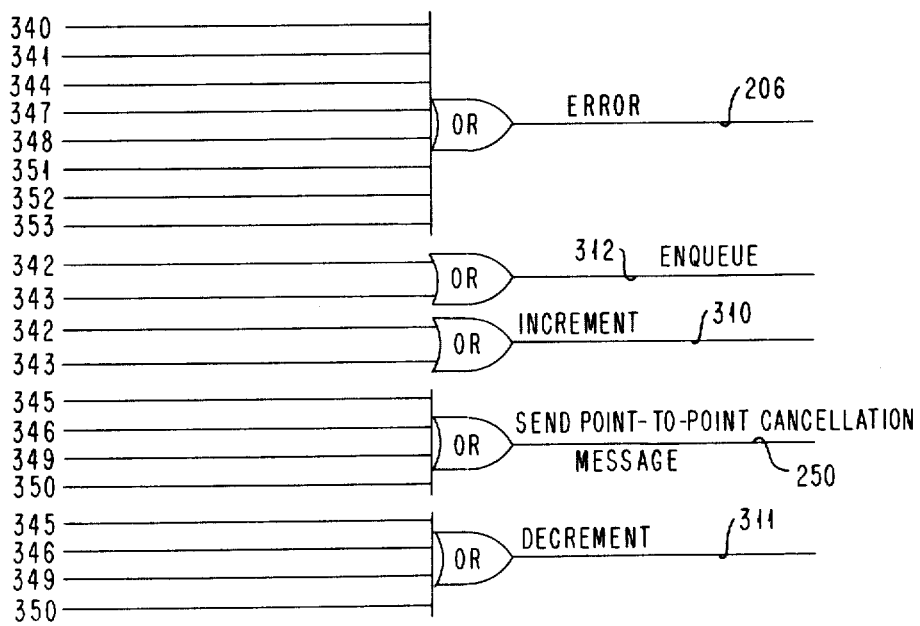

PROTOCOL FOR INTER-PROCESSOR DIALOG OVER A COMMUNICATION NETWORK

BACKGROUND OF THE INVENTION

1. Field of the Invention

The apparatus of the present invention generally relates to communication networks, and more particularly to establishing connections between a plurality of requestors for use of a plurality of resources being shared by requestors.

2. Description of the Prior Art

In some computer communications systems, the delays entailed in message transmission and processing may be unknown, and messages may even be lost. Resources may be unable to service requests. Despite this, it is essential that all elements of a communication system have a consistent view of the state of the system, to prevent errors in system operation.

As an example of an inconsistent view, consider a system in which (a) one processor sends a request message and assumes that the request has been rejected unless an acceptance message arrives within 1 msec., (b) a processor (resource) that can service that request may take as long as 2 msec. to reply to a request message, and (c) a resource remains committed to a requestor once it has sent an acceptance message. Clearly, if a resource (a processor that provides a service) takes more than 1 msec. to reply to a request, the requestor believes its request has been rejected and goes on to other work, and the resource believes it is committed to the requestor and waits indefinitely for further messages from the requestor. This is an inconsistent view of the system state due to unpredictable delays in message handling. It results in an error in system operation. It is especially difficult to maintain a consistent view when more than one resource in the communication network is capable of servicing a request.

SUMMARY OF THE INVENTION

The communication network for which this invention is designed allows one requestor to send messages either by addressing a single resource by its own address or by sending a broadcast message to a group of resources by the address of that group. A resource may belong to more than one group (and so be able to receive messages addressed to itself or any of the groups to which it belongs). Messages may be received or may not be received by any or all members of an addressed group, and they may be answered with unpredictable delays. (Messages addressed to a single resource are never lost.)

The present invention provides interface logic for requestors and resources to create, and respond to, signals which comprise a protocol that consists of: a request message broadcast from one requestor to all resources in the communication network with the capability of providing the desired service (a time-out may cause retransmission); acceptance messages transmitted from all resources that receive the request message and can currently provide the service (with implied promises to remain committed until released by the requestor) (a time-out may cause retransmission); a confirmation message from the requestor to the resource it chooses; cancellation messages from the requestor to all other resources; retransmission of acceptance messages by resources until they receive either a confirmation or cancellation message; retransmission of cancellation message if, during a further time-out, any acceptances received after previous confirmation message.

The advantages of this protocol are that no special features are required of the communication system. No indication is required that a broadcast message has been received by all or any of its destinations (although the system does require that a message to a single recipient be received correctly), no special, critical timing is needed in the processors, requestors need not know any details of the resource in the selected class (e.g., number of available or individual addresses).

BRIEF DESCRIPTION OF THE DRAWINGS

FIG. 15 shows the sequencing flip-flops of the cancel logic shown in FIG. 12.

FIG. 16 shows the detail of output signal gating in the cancel logic of FIG. 12.

DETAILED DESCRIPTION OF INVENTION

Figure 1:
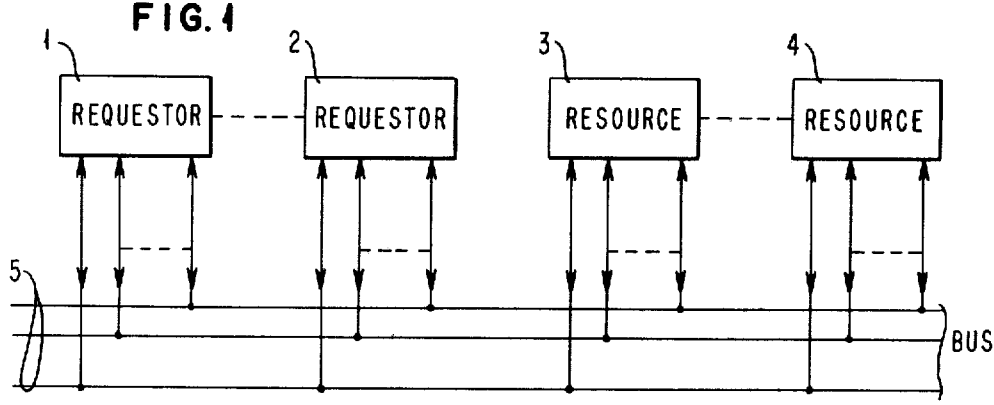
FIG. 1 is a block diagram of an inter-processor communications system.

FIG. 1 depicts a communication system in which several processors can communicate using a common bus 5. In this system, processors 3, 4 each control a resource (which may be the processing capacity of the processor itself) and are called "resources", and processors 1, 2 each require resources in order to perform a processing step and are called "requestors". In each case processors attach to the bus through a bus attachment. The bus attachments implement the protocol of the invention and are described below. The purpose of a bus attachment is to mechanize a protocol for the acquisition and release of resources by requestors. By "acquisition" is meant that the resource controlled by a processor may be used only by the requestor that has acquired that resource, until the requestor releases the resource.

The form of the communications mechanism is not critical to the invention. A simplified parallel bus structure is described with the understanding that alternate forms of the communication mechanism involving guided signals (e.g., on wire or fiber optic cable) or unguided signals (radio) are equally suitable. The communications mechanism may transmit the signals serially or in parallel: the fields of a message may be transmitted in any order if serial transmission is chosen. Different fields of the message may be transmitted in parallel or serially, either encoded or not encoded. Details of the signal transmission, involving drivers, receivers, modulators, and demodulators are not relevant to this invention and have not been included. The communications mechanism must support the broadcasting of a message, however. By "broadcasting" is meant that messages can be received by more than one recipient simultaneously.

The purpose of the bus is to support exchange of a variety of stylized messages among the bus attachments. These messages are of two kinds: messages involving the exchange of data between requestor processors and resource processors, and messages between bus attachments relating to the acquisition and release of resources by requestors. Only the resource acquisition and release messages are described here, as only these are relevant to the present invention: connections for data transmission are not shown. Data transmission may take place on additional wires in the bus 5, or on an entirely separate transmission medium.

Figure 2:
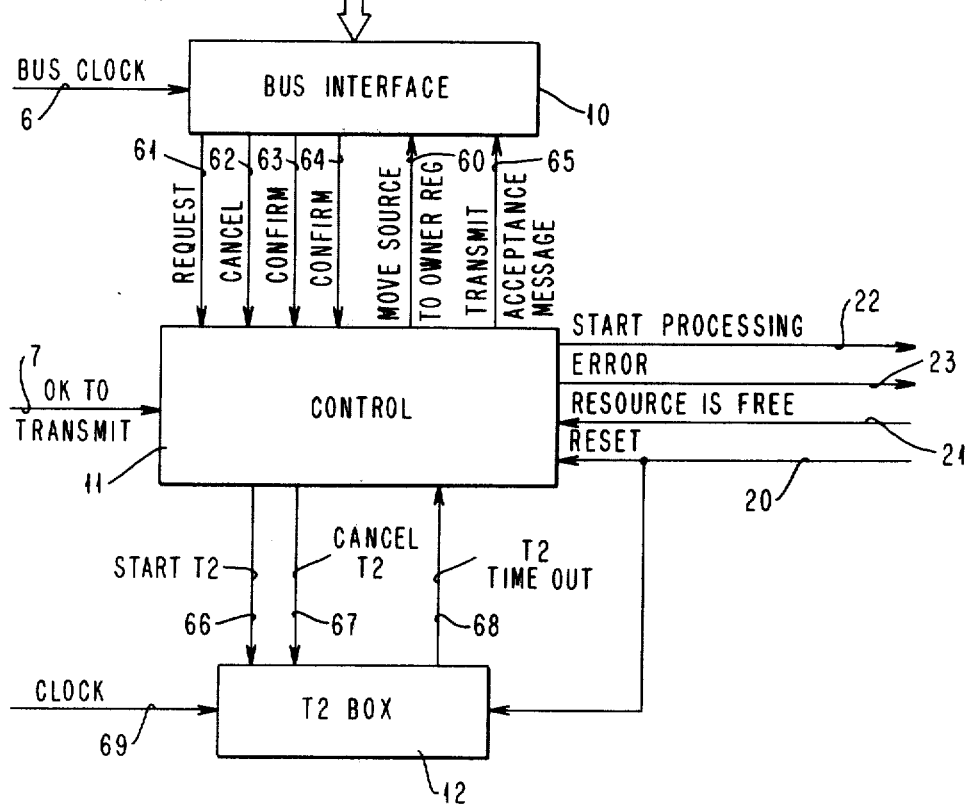
FIG. 2 is a block diagram of interface logic between a bus and a resource.

An overall block diagram of the bus attachment for a resource processor is given in FIG. 2. By this is not meant that a processor attached to such a bus attachment may only serve as a resource controller; that processor may also possess a bus attachment allowing that processor to assume the role of a requestor. Of course, in such cases a more economical design may result if a single integrated adapter is designed, wherein circuitry can be shared between the resource and requestor functions of the bus attachment. In FIG. 2, the processor attaches to its bus attachment on the lines marked "start processing" 22, "error" 23, "RESET" 20, and "resource is free" 21. A signal on the RESET line 20 from the processor forces the bus attachment to enter an initial state in which the resource controlled by that processor is free and in which resource allocation messages can be accepted. A signal on the "resource is free" line 21 from the processor informs the bus attachment that whatever resource is controlled by that processor is free and subject to acquisition by a requestor. This signal is generated by a processor at the conclusion of a period of resource committment when a message is received from a requestor releasing the resource. Such a message is conveyed using the data transmission mechanism and thus is not detailed further herein. The bus attachment signals its processor on the "start processing" line 22 to indicate completion of the resource allocation dialog with a requestor: the resource has been committed to a requestor by the bus attachment. The bus attachment signals the processor on the "error" line 23 to indicate that an error has occurred during the resource acquisition dialog.

FIG. 2 shows the required timing signals on the bus. Specific timing relationships are discussed here as an example: other implementations are possible. A "bus clock" signal 6 is assumed available from the bus to indicate that a message is valid on the bus. State changes in the bus attachment occur at a time subsequent to the bus clock but before the next bus clock. The bus signal "OK to transmit" 7 indicates that the bus 5 is available to a specific bus attachment for the transmission of a message. The details of how this signal is generated are not relevant to this description, and several techniques are known in the art. Specifically, the signal "OK to transmit" 7 may be generated periodically by a central bus controller on a separate wire to each bus attachment in such a manner that no two bus attachments simultaneously receive the signal.

Figure 3:
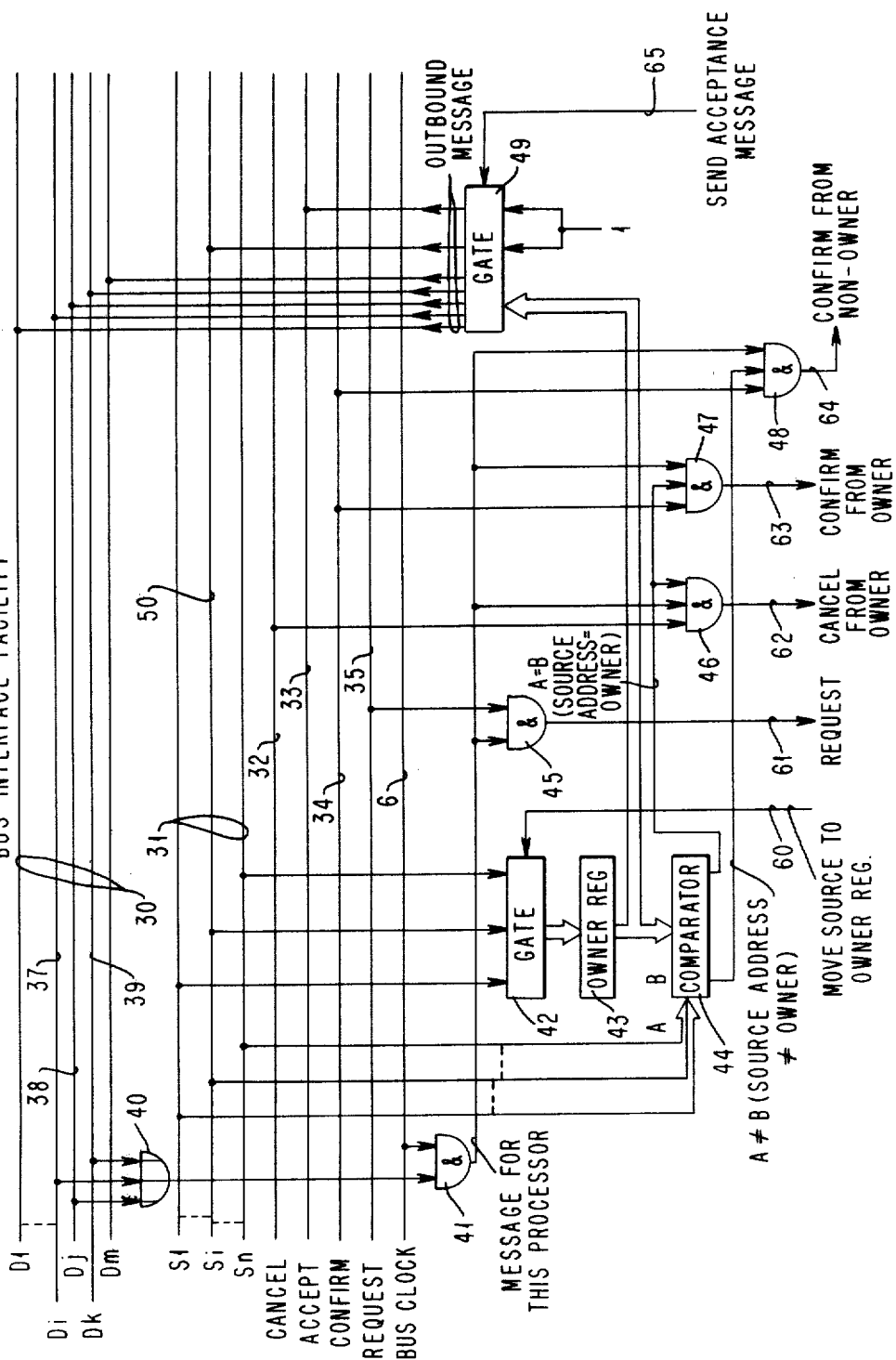
FIG. 3 shows detailed logic of a bus interface used in FIG. 2.
Figure 4:
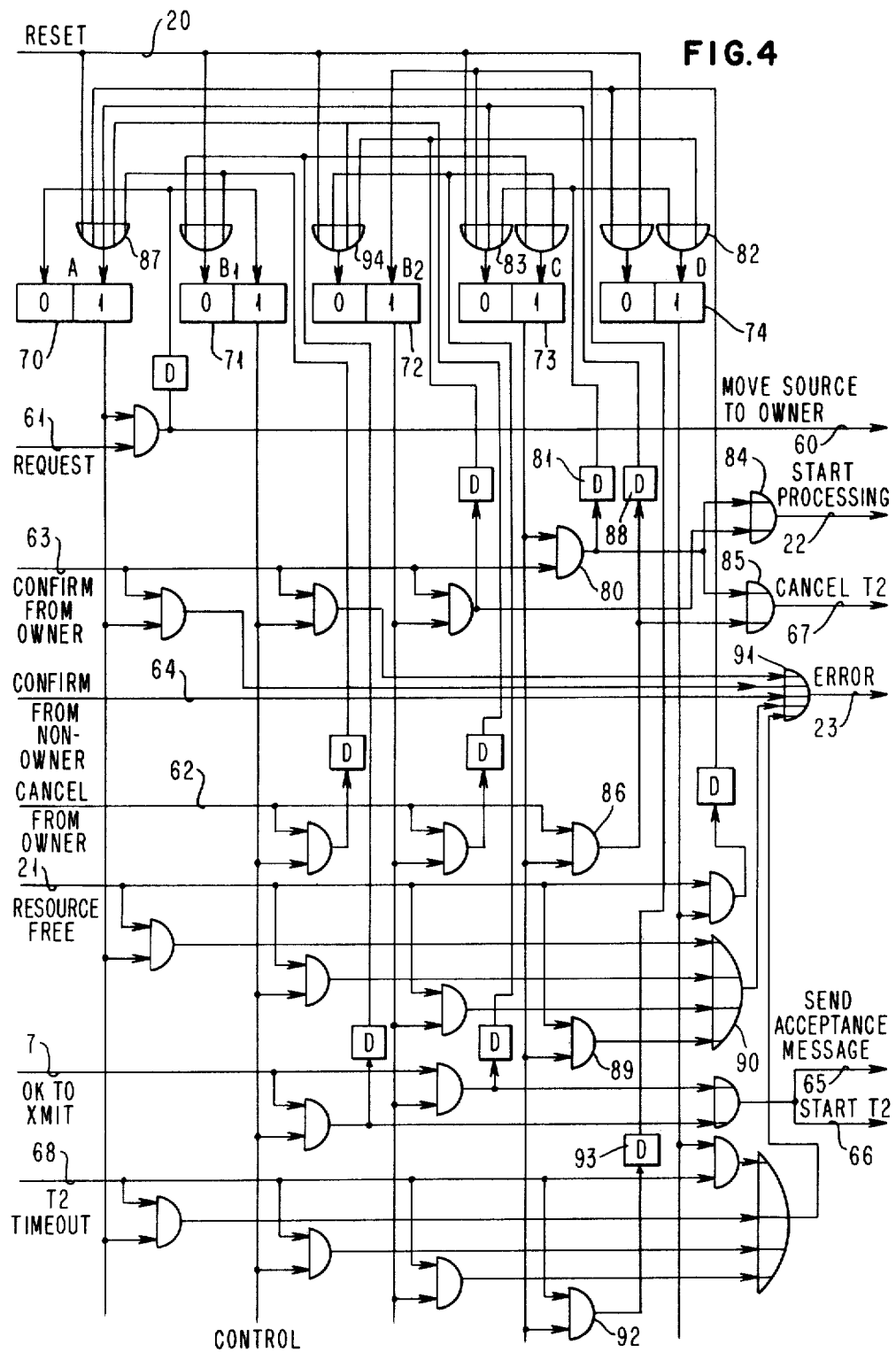
FIG. 4 is detailed logic of the control mechanism of FIG. 2.
Figure 5:
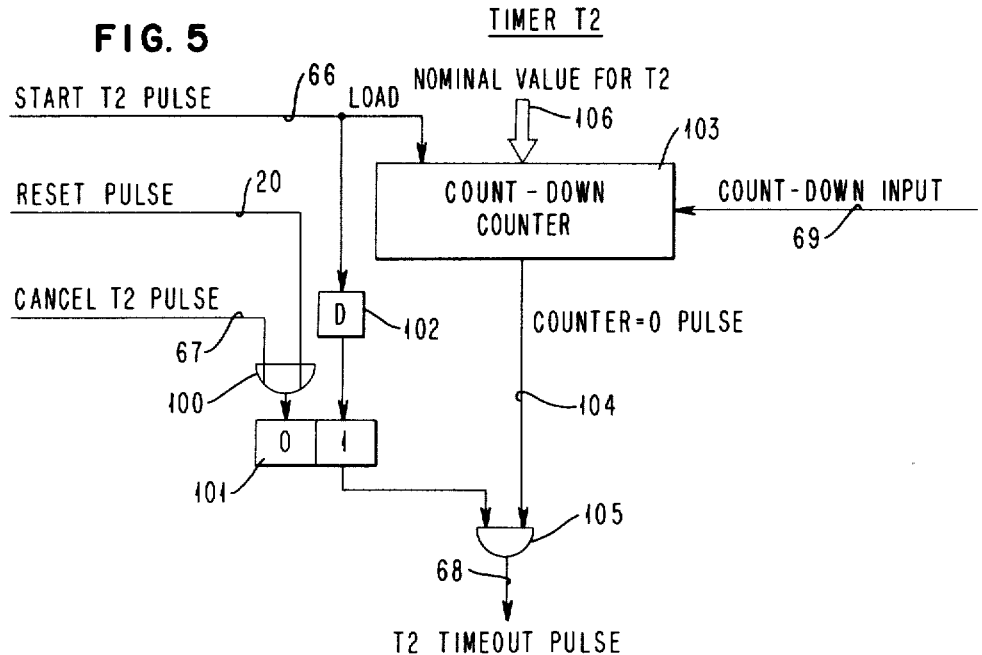
FIG. 5 is detailed logic of a timer used in the apparatus of FIG. 2.

The bus attachment consists of a bus interface facility 10, detailed in FIG. 3, a control generator 11 detailed in FIG. 4, and a timer T2 box 12 detailed in FIG. 5. The purpose of the bus interface facility 10 is to recognize and latch information from the currently received message on the bus 5 and to place designated messages on the bus 5. The purpose of the control generator 11 is to react to messages as they arrive and to initiate messages to requestors in accordance with a predefined protocol which forms the substance of the invention. In addition, the control generator 11 receives signals from and sends signals to the attached processor. The purpose of the timer T2 box 12 is to function as an interval timer under control of the control generator 11.

FIG. 3 details the internal structure of the bus interface facility 10. It is seen that the bus 5 consists of m lines 30 D1, D2, . . . Dm which are driven in a mutually exclusive manner by a transmitting bus attachment to select a subset of the bus attachments as a destination for the current message. For example, line Di 37 would be driven by a bus attachment if that attachment desired to send the current message to bus attachment i, as shown in FIG. 3. Coincidence of the selection signal Di 37 and the bus clock 6 enables the AND gate 41, further enabling transmission of the signals 32, 34, and 35 to the control generator 11. In the discussion below the enabling of AND gate 41 is referred to as "selection". It is also seen that a bus attachment may be selected by signals Dj 38 and Dk 39 because they are ORed with Di 37 in OR gate 40. When a message selects several bus attachments due to non-unique selection, the message is said to have been "broadcast". In this example, signals Dj 38 and Dk 39 cause selection of the bus attachment even though the bus attachment may not drive these signals in the source field 31. It is intended that messages whose Dj signal 38 or Dk signal 39 are present are broadcast messages.

The bus 5 further consists of the lines CANCEL 32, ACCEPT 33, CONFIRM 34, and REQUEST 35 driven in a mutually exclusive manner by the transmitting bus attachment to indicate the type of message being sent.

The bus further consists of n lines 31 S1, S2, . . . Sn indicating the source of the message. These source lines 31 are driven in a mutually exclusive manner similarly to the selection lines 30. The correspondence between the source address sent with all messages from a bus attachment for resource i and destination address recognized for messages to the same attachment is made because the bus attachment driving one of these source lines 31 (for example Si 50) must have the corresponding destination line Di 37 as an input to OR gate 40 in its bus attachment. In this manner, when a resource bus attachment responds to a request message, the source field 31 of the message may be used directly as the destination field 30 of the reply message. The comparator 44 compares the signals on the source lines 31 to the current contents of the "owner" register 43 which may be loaded from the source lines 31 by the control signal "move source to owner register" 60. The comparator 44 serves to indicate whether the source of the current message is the same as the current contents of the "owner" register 43. It is seen that when a message selects this attachment, the lines "request" 61, "cancel from owner" 62, "confirm from owner" 63, and "confirm from non-owner" 64 may be driven to the control generator. For example, the line "confirm from non-owner" 64 is driven if this attachment is selected, a signal is present on the CONFIRM line 34, and the contents of the source lines 31 does not match the contents of the "owner" register 43. Note that the lines to the control generator 11 must all be gated with the bus clock 6 and with selection of this bus attachment; this is accomplished through the gates 45, 46, 47, and 48.

A further component of this facility, the "outbound message" gate 49, can be enabled by the signal "send acceptance message" 65 from the control generator 11. This gate places the contents of the "owner" register 43 on the destination lines 30, drives the source line Si 50 to 1 (indicating the source of the message as bus attachment i), and drives the ACCEPT line 33 to 1.

FIG. 4 describes the control generator 11 that supervises responses to messages received from the bus 5. The circuit of FIG. 4 is a finite state machine consisting of five flipflops labelled A 70, B1 71, B2 72, C73, and D74. Exactly one of these flipflops is set at a given time; the circuit is said to be in state B1 if and only if flipflop B1 71 is set. The gating network serves to determine the next state (which flipflop to set and which to reset) and to generate the output signals "move source to owner register" 60 and "send acceptance message" 65 to the bus interface facility 10 of FIG. 3, and to generate the output signals "start processing" 22 and "error" 23 to the attached processor. In addition, the timer facility 12 of FIG. 5 is controlled by the signals "cancel T2" 67 and "start T2" 66 from the gating network. The inputs to this gating network are from the bus interface facility 10 ("REQUEST" 61, "confirm from owner" 63, "confirm from non-owner" 64, and "cancel message from owner" 62), from the attached processor ("resource free" 21, RESET 20), from the bus 5 ("OK to transmit" 7), and from the timer T2 box 12 ("T2 timeout" 68).

The operation of the circuit of FIG. 4 will be illustrated by an example. Suppose that the circuit of FIG. 4 is in state C (flipflop C 73 is set; all other flipflops are reset). Prior to entering this state a resource request message has been received and an acceptance message returned; in this state the circuit is waiting for a confirmation message to complete the resource acquisition phase of the protocol. The "owner" register 43 contains the pattern necessary to select the bus attachment which originated the resource request. The interval timer T2 12 is running, having been started in a previous state. Neither the signal "request" 61 nor "OK to transmit" 7 causes any outputs or state transitions: in this state request messages are ignored and no messages are pending to be sent.

If a confirmation message (a message with the confirm signal 34 present) with a source designation matching the current contents of the "owner" register 43 is received, the bus interface facility 10 generates the signal "confirm from owner" 63 causing the state of the circuit of FIG. 4 to change to state D. This implies resetting flipflop C 73 and setting flipflop D 74. The signal to accomplish this is derived from AND gate 80 in FIG. 4, applied to the SET input of flipflop 74 through delay 81 and OR gate 82 and applied to the RESET input of flipflop 73 through delay 81 and OR gate 83. The delay 81 is necessary to prevent the state transition from occurring while the signal "confirm from owner" remains valid, for if this signal is still valid when state D is attained, a further state transition will occur. Also, when in state C and the signal "confirm from owner" 63 arrives, the processor must be signalled that its attached resource is committed and that commitment has been confirmed; this is done by raising the "start processing" line 22 through AND gate 80 and OR gate 84. Also, timer T2 12 must be cancelled; this is done by raising the "cancel T2" line 67 through AND gate 80 and OR gate 85.

If in state C and a cancel message arrives whose source matches the contents of the owner register 43, the bus interface facility 10 raises the line "cancel from owner" 62. This, together with the output of flipflop C 73 being 1 enables AND gate 86 which in turn resets flipflop C 73 through delay 88 and OR gate 83 and sets flipflop A 70 through delay 88 and OR gate 87. The interval timer T2 12 is cancelled by signal "cancel T2" 67 being raised by AND gate 86 and OR gate 85.

If in state C and the signal "resource free" 21 arrives from the processor, no state transition occurs and an error signal is returned to the processor. This is done because AND gate 89 is enabled, and its output drives the "error" line 23 by way of OR gates 90 and 91. In this state the signal "resource free" 21 from the processor is an error because the processor should generate this signal only after the requestor has used the resource and released it, by sending a message to the resource processor through a mechanism not shown.

Finally, if in state C and a T2 timeout occurs, signalled by the line "T2 timeout" 68 being true, the resource has not received either a confirmation or cancellation message from the requestor in the requisite period of time. It is then necessary to resend the acceptance message from state B2. The state transition from state C to state B2 is initiated by AND gate 92, enabled when the "T2 timeout" signal 68 is true and the output of flipflop C 73 is true. AND gate 92 resets flipflop C 73 through delay 93 and OR gate 83; flipflop B2 72 is set through delay 93 directly. None of the output lines are raised. The functions of the other delays and gates in the gating network of FIG. 4 can be explained in a manner similar to the example given above.

The operation of the timer T2 box 12 can be understood with reference to FIG. 5. Central to the operation of this circuit is the count-down counter 103, decremented by the local clock signal 69. The local clock 69 is provided from a source not shown, and consists of a stable periodic signal derived from an oscillator. When the counter 103 reaches zero, further counting is disabled and the counter output signal 104 is generated. Such count-down counters are familiar to one skilled in the art, and may be constructed using integrated circuits typically similar to the Texas Instruments SN74161 type. The counter 103 is loaded with a preassigned non-zero value from lines 106 upon the occurrence of the signal "start T2" 66 generated by the control generator 11. This signal further sets flipflop 101 through delay 102, enabling the AND gate 105 to pass the "counter=zero" signal 104 when it occurs. The output of AND gate 105 is the signal "T2 timeout" 68 to the control generator 11. Upon the occurrence of either the RESET signal 20 from the processor or the "cancel T2" signal 67 from control generator 11 OR gate 100 will be enabled, resetting flipflop 101 and thus preventing a signal on the "T2 timeout" line 68 by disabling AND gate 105.

Now the relative timing of events shown in FIG. 2 can be understood. When a bus attachment is in a state waiting to transmit a message and the "OK to transmit" signal 7 arrives from the bus control, addresses and other signals are placed on the bus. Due to circuit delays, the bus signals are valid slightly after the "OK to transmit" signal 7 appears. The bus clock 6 is delayed sufficiently to guarantee valid bus data when it appears. At this time other bus attachments can receive the message. The bus clock signal 6 pulse is brief enough compared to the "OK to transmit" signal 7 that the bus remains valid for the entire pulse duration. The bus clock signal 6 provides the source for other signals in the control generator 11. Delay devices in the control generator 11 guarantee that the state flipflops change state after the other signals have ended, insuring that no additional incorrect signals are generated.

Figure 6:
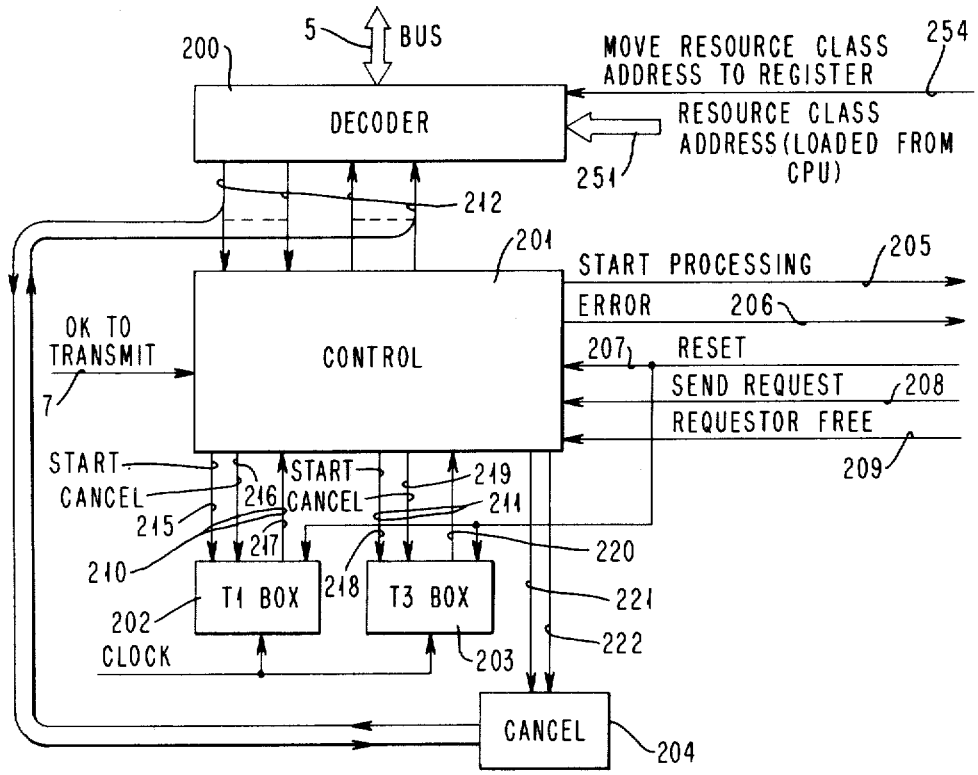
FIG. 6 is a block diagram of interface logic between a bus and a requestor.

In FIG. 6 an overall block diagram of the bus attachment of a requestor is given. The bus attachment of a requestor consists of a decoder facility 200, a control generator 201, two interval timers 202 and 203, and a CANCEL facility 204. The decoder facility 200 performs a function similar to, but not identical to, that of the bus interface facility 10 previously described for the resource bus attachment. The control generator 201 exercises overall control over the requestor bus attachment in accordance with the protocol which forms the substance of the invention. The interval timers 202 and 203 are implemented in a manner identical to the "timer T2 box" 12 detailed previously and in FIG. 5, except for possibly different initial count values, and thus will not be discussed further. The "CANCEL box" 204 serves to cancel acceptance messages from resources on a point-to-point basis when required by the control generator 201.

Communication between the requestor bus attachment and its attached processor is via the signals 205, 206, 207, 208, and 209. The "start processing" signal 205 signals the processor that the requested resource has been acquired and that processing with that resource may begin. The "error" signal 206 is an indication that during the resource negotiation some error condition occurred. The "RESET" signal 207 from the processor causes the control generator 201 to attain such initial state in which a request to acquire a resource can be accepted from the processor on the "send request" line 208. Finally signal 209, "requestor free", is a signal from the processor to its bus attachment that the requested resource has been released and that a new resource request may be forthcoming.

In the description below only one resource can be acquired at a time and must be released before another resource can be acquired. This is not a limitation of the invention, but has been imposed for purposes of clarifying this description. Those skilled in the art would be capable of designing a mechanization able to handle multiple simultaneous resource acquisitions, given an understanding of the restricted mechanization presented herein.

Communications between the control generator 201 and the interval timers 202 and 203 are accomplished via signals 210 and 211, respectively. These sets of signal lines are comprised of signals to start the timers (215, 218), signals to cancel timers (216, 219), and signals from the timers to indicate that the timers have timed out (217, 220). Communications between the processor and the decoder 200 is on lines 251 which contain the designation of the resource class requested by the processor. The designation of the resource class is of the same format as the signals required on the selection lines 31 of FIG. 3, and is supplied by the processor before the processor begins the resource acquisition process by signalling on the "send request" line 208. The resource class signals 251 are stored in the decoder 200 when the processor signals on the "move resource class address to register" line 254. The decoder 200 further communicates signals with the bus 5. Communications between the decoder 200 and the control generator 201 and the cancel box 204 are accomplished via lines 212, detailed in FIG. 7.

Figure 7:
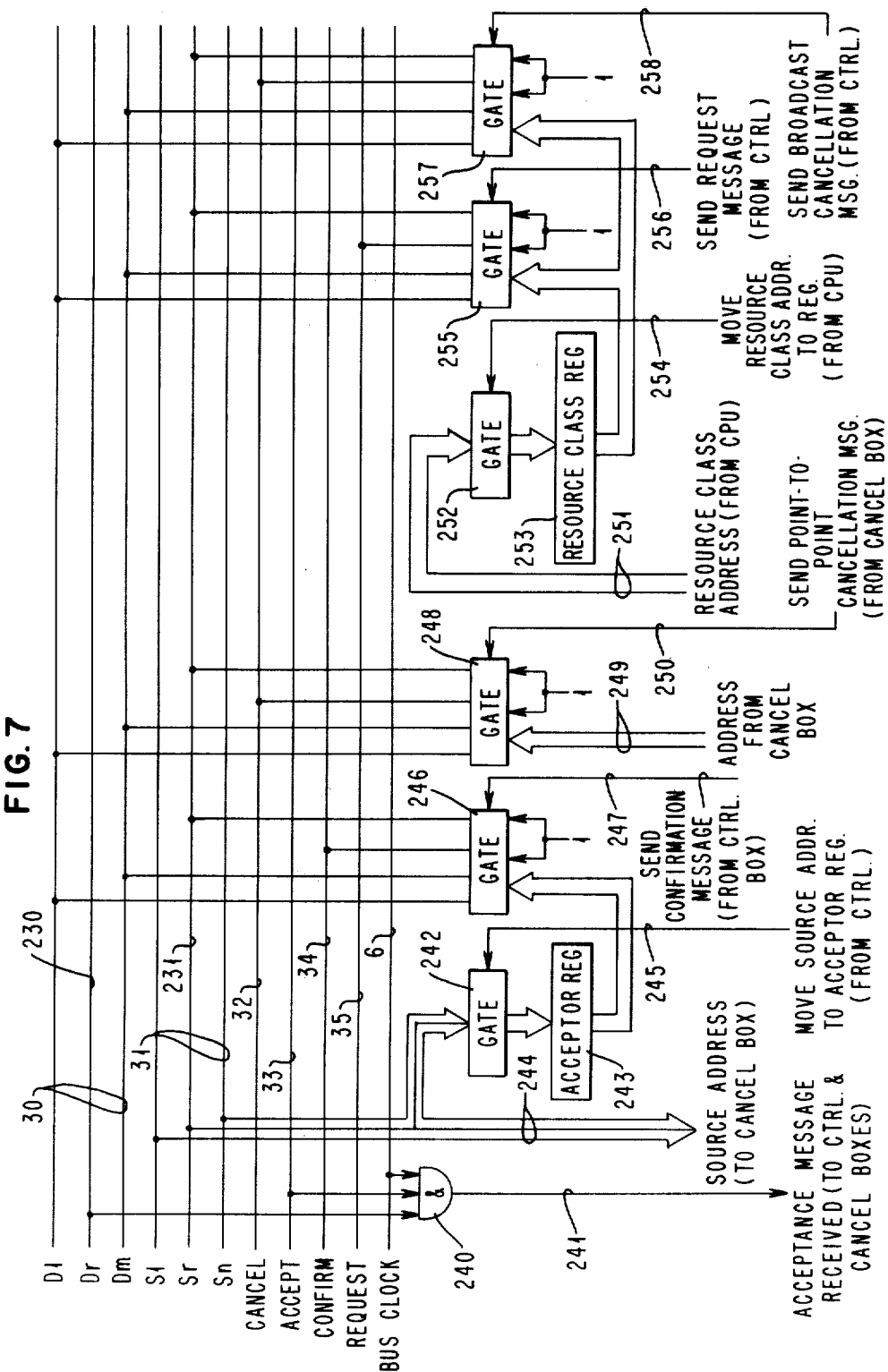
FIG. 7 shows detail of the logic of the decoder used in FIG. 6.

FIG. 7 details the structure of the decoder 200. The purpose of the decoder 200 is to form an interface with the bus 5 as comprised of the destination lines 30, the source lines 31, the CANCEL line 32, the ACCEPT line 33, the CONFIRM line 34, the REQUEST line 35, and the bus clock 6. In addition, the decoder exchanges signals with the control generator 201 on lines 212, comprised of the "acceptance message received" line 241, the "move source address to acceptor register" line 245, the "send confirmation message" line 247, the "send request message" line 256, and the "send broadcast cancellation message" line 258. Signals from the processor are received by the decoder 200 on the "resource class address" lines 251 and the "move resource class address to register" line 254. Signals to and from the cancel box 204 are carried on the "acceptance message received" line 241, the "source address" lines 244, the "address" lines 249, and the "send point-to-point cancellation message" line 250.

In this example the bus attachment is selected by a signal on the destination line Dr 230. The decoder 200 monitors the bus lines 30, 33, and 6 for a coincidence of a particular destination line Dr 230, a signal on the ACCEPT line 33, and the bus clock 6. This coincidence is detected in AND gate 240 whose output is the signal "acceptance message received" 241. The source lines 31 are made available to the cancel box 204 via the "source address" lines 244. These lines are also input to gate 242, enabled by the signal "move source address to acceptor register" 245 from the control generator. When this signal 245 is true, the contents of the source lines 31 are copied into the acceptor register 243. Subsequently, the contents of the acceptor register 243 may be placed on the destination lines 30 when gate 246 is enabled by the signal "send confirmation message" 247 from the control generator. When gate 246 is enabled, the CONFIRM line 34 and a selected source line Sr 231 are driven to 1. The source line Sr 231 driven corresponds to the destination line Dr 230 that serves as one of the signals enabling AND gate 240. Thus, the particular set of signals on the destination lines 30 that cause selection of this particular bus attachment is returned on the source lines 31 when a confirmation message is sent.

Gate 248, which is enabled by a signal on the "send point-to-point cancellation message" line 250, places the contents of lines 249 on the destination lines 30 while simultaneously driving the source line Sr 231 corresponding to this bus attachment to 1 and driving the CANCEL line 32 to 1. This sends a cancellation message to a specific bus attachment. The selection of which bus attachment is to receive the cancellation message is controlled by the cancel box 204 via lines 249. The enabling of gate 248 via line 250 is also performed by the CANCEL box 204.

Gates 255 and 257 are used to place a broadcast request message and a broadcast cancellation message respectively, on bus 5. Gate 252, enabled by the processor via the "move resource class address to register" line 254, sets the resource class register 253 to the contents of the "resource class address" lines 251 from the processor. The contents of the resource class register 253 can be placed on the destination lines 30 if gate 255 is enabled by the "send request message" line 256 driven by the control generator 201. When this is done, the REQUEST bus line 35 is driven to 1, as is the source line Sr 231. The contents of the resource class register 253 can also be placed on the destination lines 30 when gate 257 is enabled by a signal on the "send broadcast cancellation message" line 258, driven by the control generator 201. When this is done, the CANCEL bus line 32 is driven to 1, as is the source line Sr 231.

The control generator 201 is implemented as a finitestate device, in a fashion similar to the implementation of the control generator of FIG. 4. The device has been drawn in four separate FIGS.—8, 9, 10, and 11—in order that its operation may be understood more clearly.

The function of the control generator 201 is described with reference to FIGS. 8, 9, 10, and 11 which give the state table representation of the function of the control generator: the next-state matrix, the output matrix, the state flipflops, and the output gating respectively. The circuit of FIGS. 8, 9, 10, and 11 is a finite state machine whose state is maintained in the state flipflops 460-467 of FIG. 10. Exactly one of these flipflops is set at any given time. The columns of a state table are labelled according to the output lines of the state flipflops 460-467 which are also labelled A 470, B1 471, B2 472, C 473, D 474, E 475, F 476, and G 477. For example, the state of the finite state machine depicted in FIGS. 8, 9, 10, and 11 is said to be B2 if state flipflop 462 is set and therefore among all the signals 470-477 only 472 is 1. The discussion of the mutually exclusive nature of the input signals given in the description of the finite state machine of FIG. 4 applies here also. By reference to the circuit of FIG. 10 it can be seen that upon an occurrence of the RESET signal 207 all of the state flipflops 461-467 are reset and state flipflop 460 is set.

Figure 8:
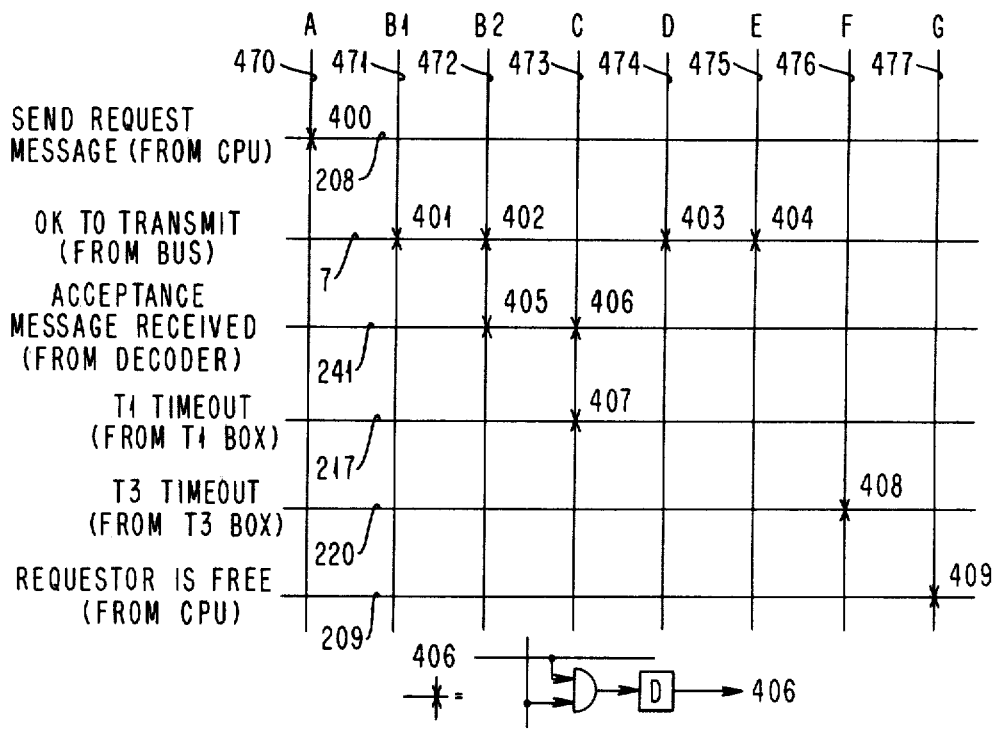
FIG. 8 represents detail of the control apparatus of FIG. 6 controlling the sequencing of the apparatus.
Figure 9:
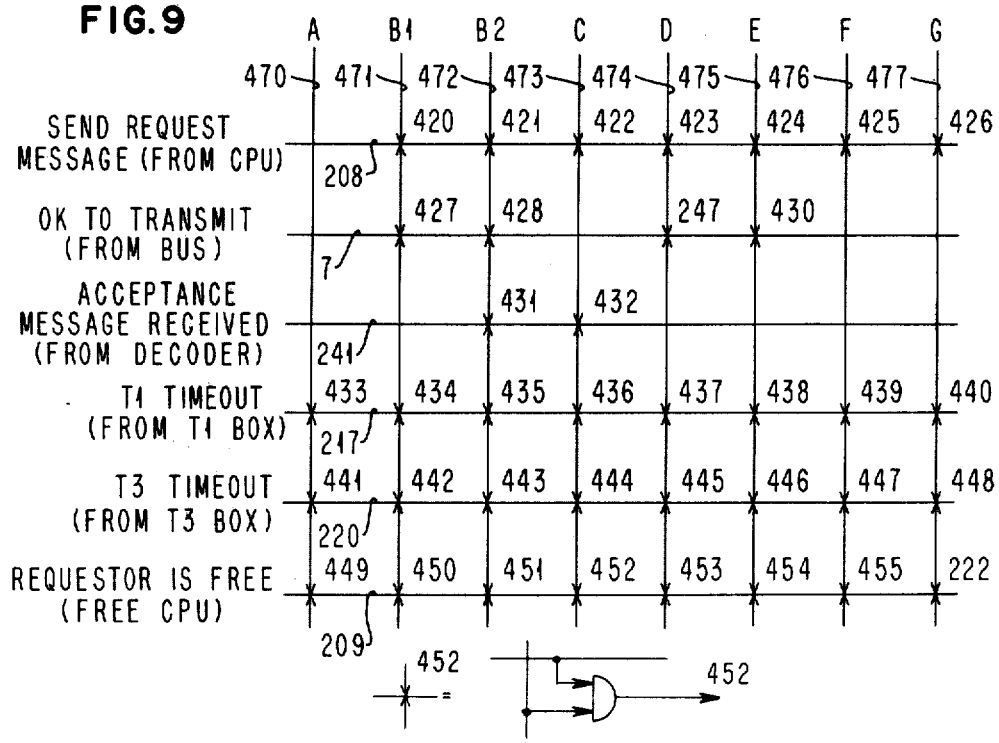
FIG. 9 is a representation of the details of the control of FIG. 6 controlling the generation of output control signals.
Figure 10:
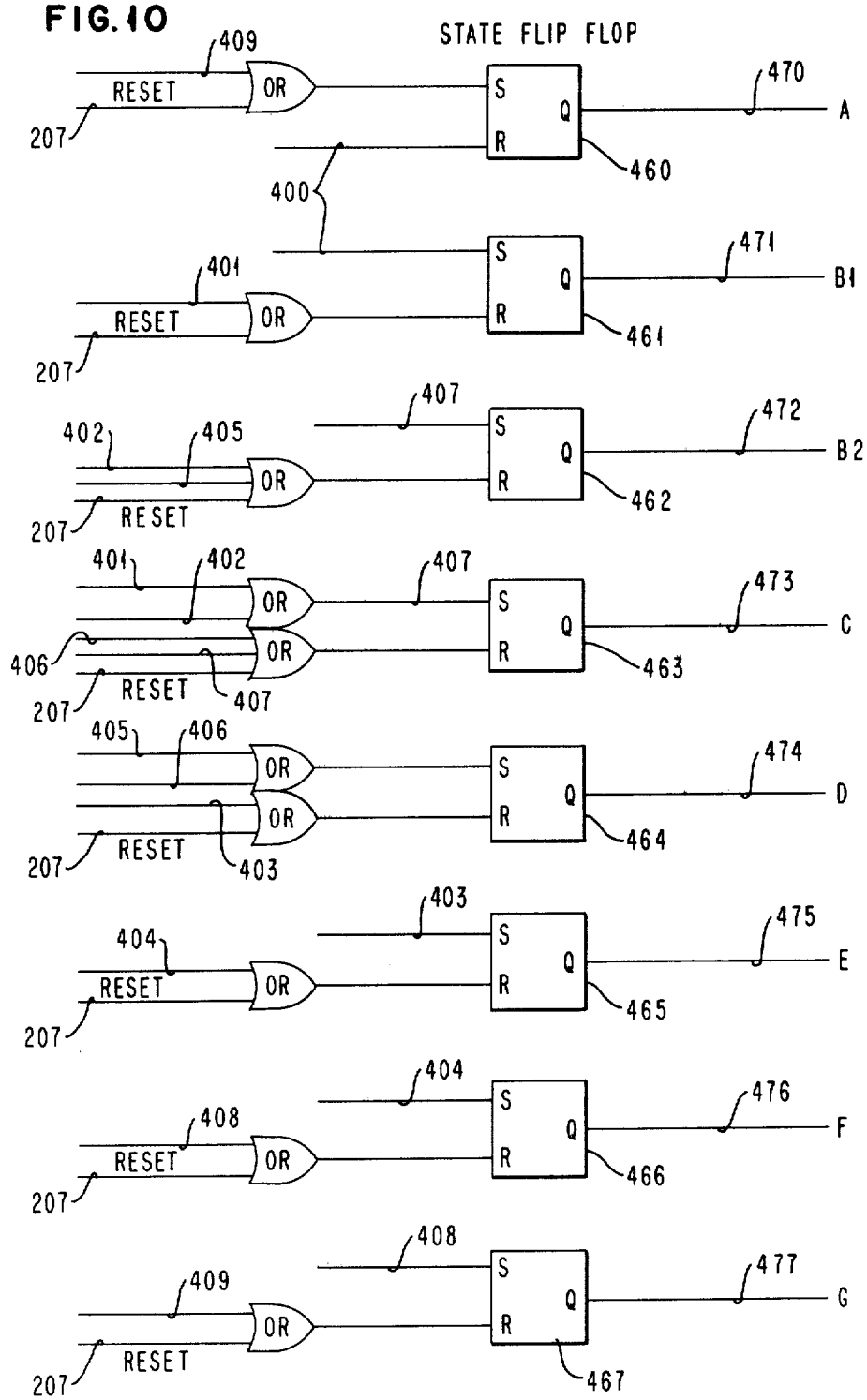
FIG. 10 shows the details of the state sequencing of flip-flops of the control of FIG. 6.
Figure 11:
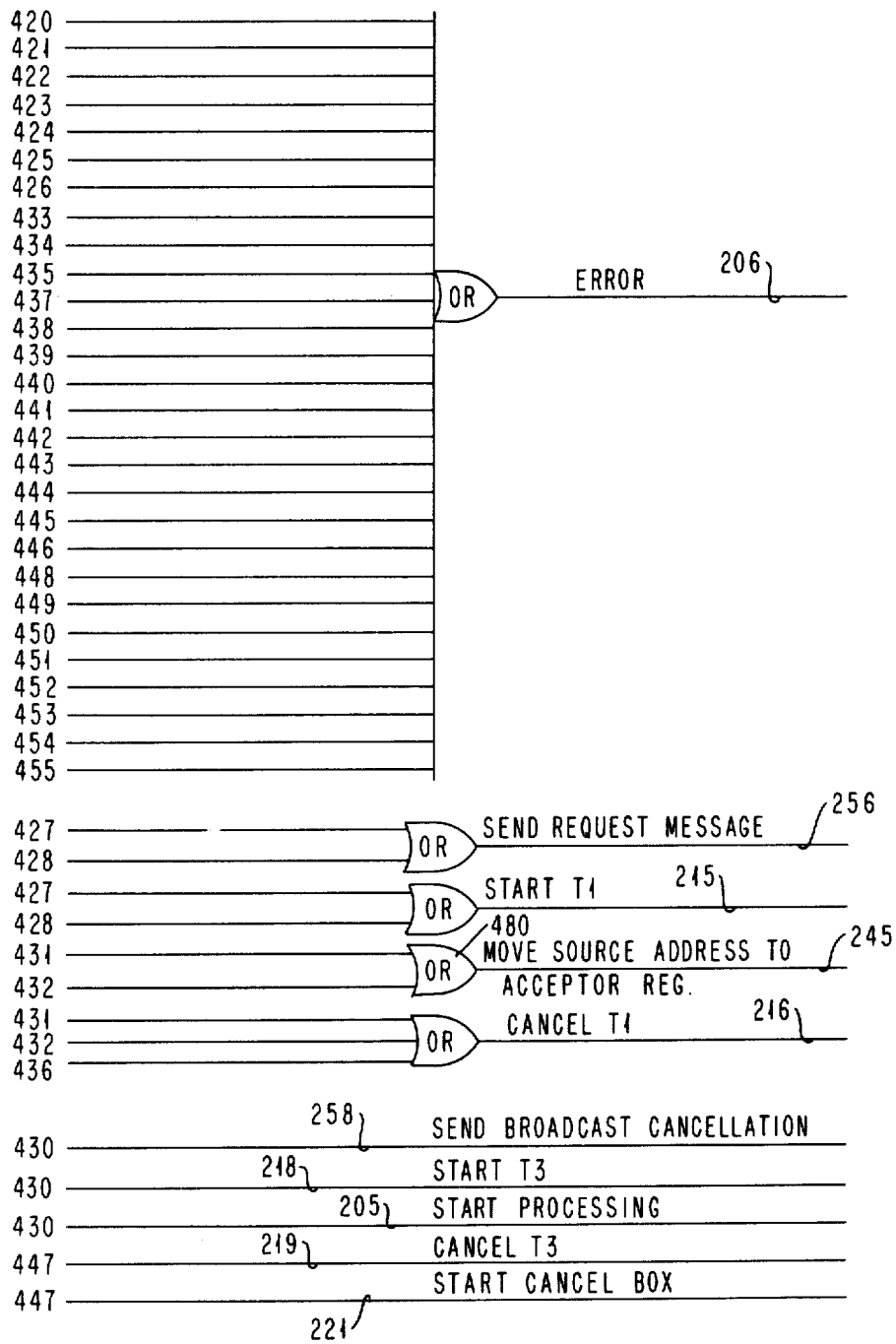
FIG. 11 shows the details of output signal gating of the control of FIG. 6.

The next-state matrix of FIG. 8 determines the next state of the finite state machine and consequently the setting and resetting of the state flipflops 460-467 by deriving the signals 400-409 which appear as inputs to OR gates in FIG. 10. In FIG. 8, certain intersections of signal lines running vertically and horizontally are marked with an "X", and by this is meant that at those intersections an AND gate whose output is delayed is present. This schematic equivalence is also shown in FIG. 8. The function of the delay was given earlier during the description of FIG. 4. The output matrix of FIG. 9 is similar in form to the matrix of FIG. 8 except for the placement of the AND gates. In this matrix, the outputs of the AND gates do not require delay. The function of the output matrix is to derive signals which appear as inputs to the output gating circuitry of FIG. 11, as well as to directly derive the signals "stop cancel box" 222 and "send confirm message" 247.

The function of the finite state machine illustrated in FIGS. 8, 9, 10, and 11 will now be explained in an example. Suppose the finite state machine to be in state C, wherein among the state flipflops 460-467 only state flipflop 463 is set. The control is in state C when a request message has been sent but no acceptance message has been received. It is seen that no action results if the signal "OK to transmit" 7 arrives, because no messages are waiting to be sent. Suppose first that the signal "send request" 208 is generated by the processor. Since the resource acquisition process has already begun when the finite state machine is in state C, this is an error. No state transistions occur as reflected in the absence of an "X" in the C column, "send request message" row of FIG. 8. The output "error" is generated because of the signal 422 generated in FIG. 9 which is an input to the OR gate whose output is the "error" signal 206 in FIG. 11. Suppose now that while the state C the signal "acceptance message received" 241 is raised by the decoder 200. The signal 406 in FIG. 8 then becomes 1. It is seen by reference to FIG. 10 that signal 406 resets flipflop 463 and sets flipflop 464, effecting the state transition from state C to state D. The control is in state D when it is waiting to send a confirm message. Similarly, signal 422 of FIG. 9 becomes 1, and since this signal is one of the inputs to the OR gate 480 of FIG. 11 whose output is the signal "move source address to acceptor register" 245, that signal will also become 1. Signal 432 is also one of the inputs to the OR gate of FIG. 11 whose output is the signal "cancel T1" 216 and therefore that signal will also becomes 1. The example has illustrated the functions of the next state matrix of FIG. 8 and the output matrix of FIG. 9 in deriving signals to change the state of the state flipflops 460-467 of FIG. 10 and to enable the OR gates for output signals of FIG. 11.

The function of the requestor's cancel box is to send point-to-point cancellation messages to all resources that send acceptance messages after the requestor has confirmed the first acceptance received. Since more than one acceptance message may arrive before the requestor can transmit the first cancellation message, and subsequent acceptance message may arrive before all cancellation messages are transmitted, it is necessary to provide means for remembering what cancellation messages must be sent. The cancel box performs this function. Once started, it enqueues the source fields of the acceptance messages received and sends a cancellation message to each of them whenever an "OK to transmit" signal is received. When it is stopped, it discontinues enqueueing source fields but continues sending cancellation messages until its queue is empty.

Figure 12:
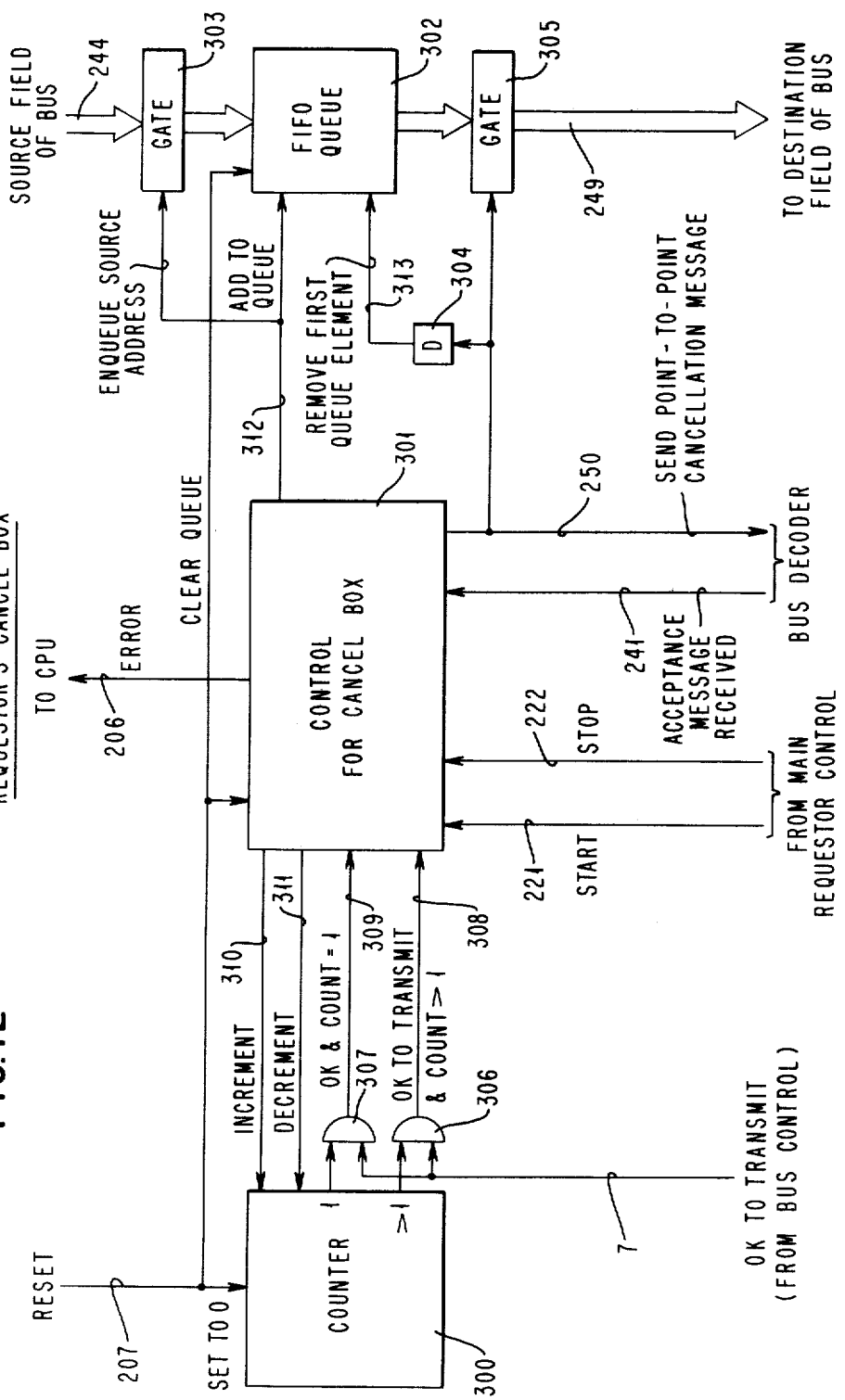
FIG. 12 is a block diagram of the cancel logic of requestor interface apparatus shown in FIG. 6.

FIG. 12 gives a block diagram of the cancel box 204. The cancel box 204 is used to cancel acceptance messages from resources that arrive after the control generator 201 has caused a broadcast cancellation message. The cancel box 204 is composed of an up/down counter 300, a control generator 301, a FIFO queue 302, and supporting circuitry. The up/down counter 300 is used to store the number of unacknowledged acceptance messages received by the requestor's bus attachment and has three inputs: "set to zero", "increment", and "decrement". Two outputs, "1" and ">1" are true if the counter contains 1 or if the counter contains a number greater than 1, respectively. The counter 300 can be implemented with Texas Instruments type SN74168 integrated circuits, typically. The outputs of the counter are gated with the bus signal "OK to transmit" 7 in AND gates 306 and 307 to form the signals "OK and count=1" 309 and "OK and count >1" 308, used by the control generator 301. The FIFO queue 302 is used to store the destination specifications of unacknowledged acceptance messages from resources. The source field of an acceptance message is gated into the FIFO queue 302 through gate 303, enabled by the signal "enqueue source address" 312. Signal 312 is output from the control generator 301. The same signal 312 is used to load the source field into the queue via FIFO queue input "add to queue". The FIFO queue is emptied to the destination field 30 of the bus 5 on lines 249. The output from the FIFO queue 302 is gated to lines 349 through gate 305, enabled by the signal "send point-to-point cancellation message" 250 generated by the control generator 301. Once the output of the FIFO queue has been placed on the bus, the head entry on the queue is removed by a signal on the input "remove first queue element" 313 to the FIFO queue 302. This signal must be delayed through delay 304 to prevent the head element of the queue from being removed before it has been placed on the bus 5 for a sufficient interval. The FIFO queue 302 may be implemented with Fairchild Semiconductor type 9403 integrated circuits, typically.

The operation of the cancel box 204 control generator 301 will be described with reference to FIGS. 13, 14, 15 and 16. FIGS. 13, 14, 15 and 16 give the next state and output matrices, and the state flipflops and output gating, respectively. The description parallels that of FIGS. 8, 9, 10 and 11, and the discussion there applies equally. Note here that the RESET signal 207 causes the state flipflops 360-362 to be reset and state flipflop 363 to be set. Thus, the initial state of the finite state machine of FIGS. 13, 14, 15 and 16 is state D.

Figure 13:
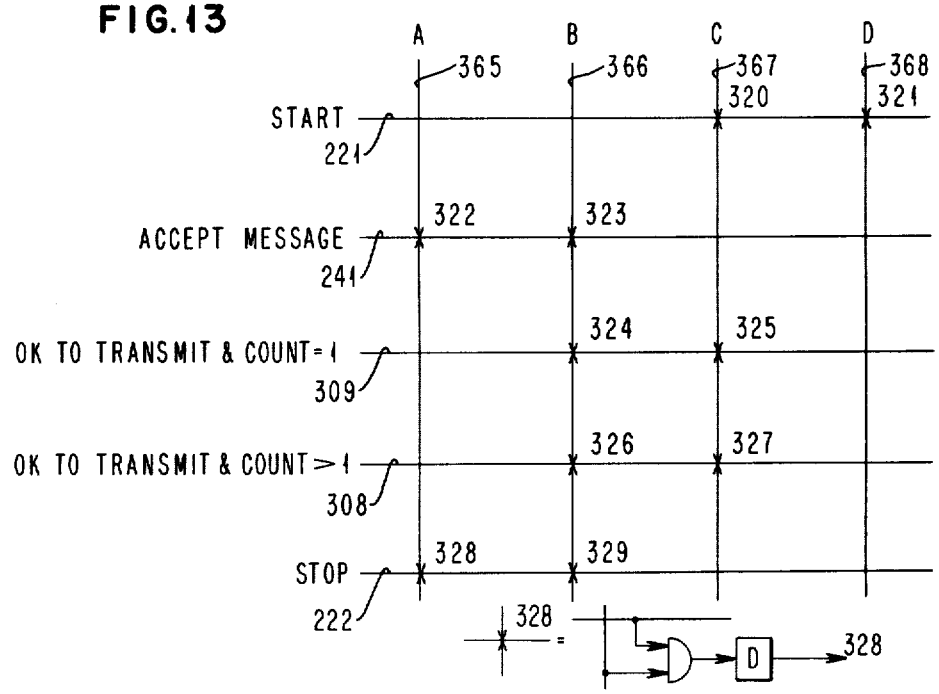
FIG. 13 is a representation of the detail of the sequencing logic of the cancel logic shown in FIG. 12.
Figure 14:
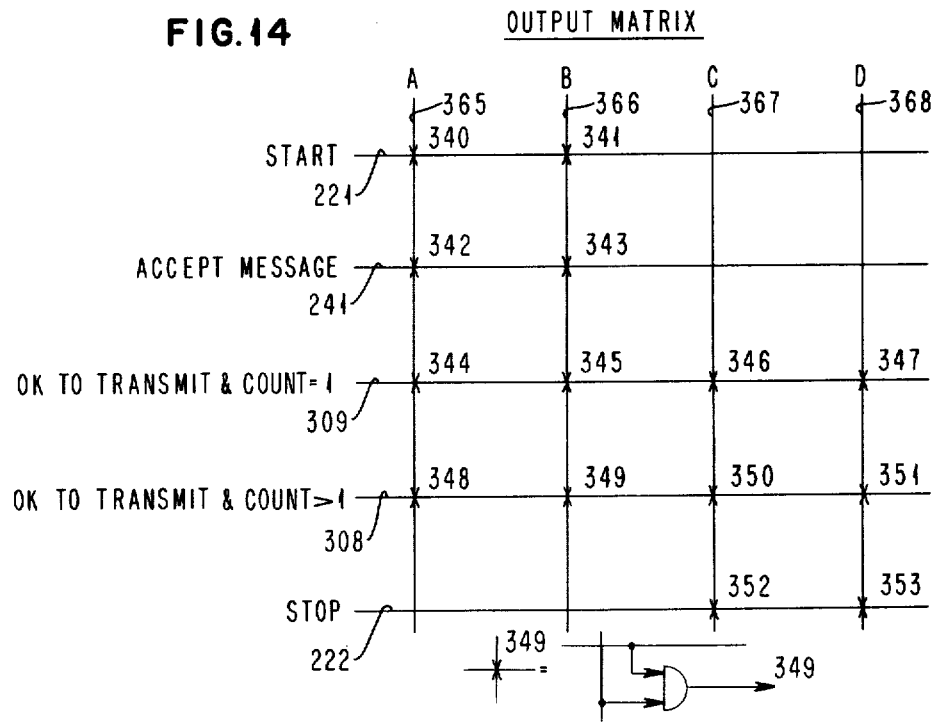
FIG. 14 is a detailed representation of output signal generation of the cancel logic shown in FIG. 12.

To illustrate the function of the circuit of FIGS. 13 and 15 in next state determination, assume that the circuit is in state B, wherein flipflop 361 is the only one of the state flipflops 360-363 that is set. The control is in state B when the cancel box is waiting to send a cancellation message. Thus, signal 366 is 1: signals 365, 367 and 368 are 0. If the signal "OK and count=1" 309 from gate 307 becomes 1, signal 324 will be generated by the next state matrix of FIG. 13. With reference to FIG. 15 it is seen that signal 324 causes flipflop 360 to be set and flipflop 361 to be reset, thus causing a state transition to state A. The control box is in state A when the queue is empty but it remains active. To illustrate the function of the circuit of FIGS. 14 and 16, in output determination assume that the circuit of FIG. 15 is in state B, wherein flipflop 361 is the only one of the state flip-flops set. If the signal "OK and count=1" 309 from gate 307 becomes true, signal 345 will be generated by the output matrix of FIG. 14. With reference to FIG. 16, it is seen that the presence of signal 345 causes the signals "send point-to-point cancellation message" 250 and "decrement" 311 to become 1: these signals cause the transmission of a point-to-point cancellation message and cause the counter 300 to be decremented.

In the preceeding discussion, the protocol sends a broadcast cancellation message to all resources of the designated group after the point-to-point acceptance message is sent. This requires all resources in the designated group to process the cancellation message. Furthermore, in some designs as the number of messages sent on the bus increases, the probability that a given resource fails to receive the broadcast cancellation message may increase. Therefore, the number of messages sent for resource acquisition may increase as the system becomes more heavily loaded. This effect is one of positive feedback, and may lead to instability of the system. An alternative form of the protocol requires that the requestor acknowledge each acceptance message from a resource that is not required with a point-to-point cancellation message. As the resource usage in the system increases, the number of resources which respond to the inital request message will decrease and thus the number of response messages from the requestor will also decrease. This modification to the basic protocol tends to reduce the overhead for resource acquisition as the system loading increases, a desirable situation. On the other hand, the requestor must always acknowledge each resource reply; whereas, if the broadcast cancellation in the previous protocol is received by all the resources of the designated group, the requestor transmits only two messages: the point-to-point confirmation and the broadcast cancellation. In the discussion below, modifications to the resource bus attachment and to the requestor bus attachment are discussed in order to change their function to correspond to the modified protocol (no broadcast cancellation message).

The configuration of the bus attachment for a resource is modified so that the timer T2 box is not required. This is because once an acceptance message has been sent by the resource, a reply is certain to be forthcoming. This is by assumption: all point-to-point messages will be received and acknowledged within a finite time. The mechanization of the control generator 11 of FIG. 4 is modified appropriately. As with FIG. 4, occurrence of the signal "request" 61 from the decoder 10 places a signal on the "move source address to owner register" line 60. The signals causing start and stop of T2 are not required; neither are the confirmation message signals.

The requestor bus attachment for the modified protocol (no broadcast cancellation messages) is as shown in FIG. 6 except that no timer T3 box is required and therefore the control matrices are not required to generate any controls for T3. This is because T3 times the response to the broadcast cancellation message, which is not present in the modified protocol.

The modified protocol, in which all cancellation messages are point-to-point, also applies to the special case in which just one copy of the resource exists in the system. Under these circumstances the requestor expects either exactly one or no reply to its request message. If no reply is received in the T1 timeout period, the requestor will resend the request message at intervals equal to the nominal value set in the interval timer T1 202. If only one reply is received, the confirmation is point-to-point as always. No cancellation is required. More than one acceptance reflects an error. The processor requesting the resource is given no notification of the unavailability of the resource.

Under certain circumstances, when a requestor is unable to acquire a resource, the processor may be able to choose an alternate processing path which does not require the resource. At a later time, the processor would attempt to acquire the resource again. In order for this to be done, the requestor bus attachment must notify the attached processor when it appears the resource acquisition process will be lengthy; in the protocol this is conveniently indicated by the expiration of the timer T1. This event occurs when no resource has responded to an acquisition message because they are all busy. A modification to the bus attachment adds a line "signal CPU—T1 timeout" from the control generator 201 to the processor. The function of the processor is as follows:

1. Issue the signal "send request" 208.
2. Await either a signal "start processing" or a signal "signal CPU—T1 timeout".
3. If the signal "start processing" arrives, begin processing using the newly acquired resource. If the signal "signal CPU—T1 timeout" arrives, begin processing an alternate program sequence not requiring the resource.

In some systems, delay may be so long that a resource may send an acceptance message after a requestor has received an acceptance from another resource, used that resource, released the resource, and broadcast a request for another resource. This can lead to errors in two ways. First of all, if the second resource requested is in a different class from the first resource requested, then the requestor would view the acceptance message from the resource of the first class as being an acceptance of its request for a resource from the second class, leading to use of an incorrect resource. This problem is avoided by a further modification. The essence of the alternative is the addition of a serial number field to each request message and acceptance message. A serial number is automatically generated by the decoder facility 200 of the requestor. Each resource that is available saves the serial number from the request message and returns it with its acceptance message. The requestor rejects (sends cancellation messages for) all acceptance messages with serial numbers that do not agree with the serial number in the request message just sent.

The second way in which the delayed acceptance can lead to errors is found in a system in which messages can be delayed for arbitrary times. In this case, a resource may receive the first request message and send an acceptance message, and later receive the broadcast cancellation message for the first request. Under certain delay conditions, the acceptance message may arrive at the requestor after it has sent its second request for a resource, and the cancellation message will be received by the resource at about the same time. The requestor logic then views the resource as having accepted the second request, while the resource logic views the first request as having been cancelled. These inconsistent viewpoints result in system malfunction. This occurs even for the second request being for the same group as the first request. The addition of a serial number field to the request and acceptance messages eliminates this source of error.

The bus interface 10 for a resource is modified to support the serial number alternative. This circuitry is identical to that depicted in FIG. 3 with the addition of a serial number field on the bus. The serial number is placed on the serial number field lines by both the requestor and the resource. For the resource, the serial number is held in a serial number register which can be set from the bus serial number field. The contents of the serial number register can be placed on the serial number field of the bus. In other respects, the bus interface 10 for the serial number alternative is identical to that of FIG. 3.

The decoder facility 200 for the requestor using the serial number alternative is modified slightly by the addition of a serial number register and a serial number field to the bus. In addition, the gate 255 has been expanded to gate the contents of the serial number register onto the serial number field of the bus. Gate 255 is still enabled by the signal "send request message" 256. The serial number register contents can be compared against the contents of the serial number field of the bus in a comparator whose outputs indicate equality and inequality. The equality output is used to enable a gate to derive a signal "acceptance message received and correct serial number" to the control generator 201. The control generator 201 uses this line, which replaces the line "acceptance message received" 241. The inequality output of the comparator is used to enable a gate whose output is the signal "acceptance message received and wrong serial number", an input to the cancel box 204 modified as described below. The serial number register may be reset by the RESET signal 207 from the processor: it is incremented by the control generator 201 each time a new resource acquisition dialog is begun.

The structure of the cancel box is the same as that depicted in FIG. 12. Only the control 301 is different, and the line "acceptance message received" 241 from the decoder 200 has been further specialized and is changed to signal, "acceptance message received with wrong serial number".

The protocol is summarized as follows. The requestor sends a broadcast request message to all resources of the desired class. It starts keeping time for interval T1. Unless the requestor receives an acceptance message from some resource before the interval has expired, it switches tasks or resends the broadcast message. The length of interval T1 is not critical. It should be long enough so that the requestor does not retry the request message or switch tasks needlessly. On the other hand, it should be short enough that the requestor does not wait too long for busy resources.

Each resource of the class that receives a broadcast request message must determine whether it can accept the request. If it cannot, it rejects the request by not replying. If it can accept the request, it sends an acceptance message. This commits the resource to the requestor. All further requests from other requestors must be rejected (not replied to) until the resource is released by the original requestor.

If the requestor receives one or more acceptance messages, before the end of interval T1, it chooses one of the resources and sends it a confirmation message while broadcasting a cancellation message to all of the other resources of the selected class. (Although this message may be received by resources that did not receive the initial broadcast request message, this does not cause any difficulties.) It should be possible to combine the confirmation and cancellation messages into a single broadcast message that can be interpreted by all resources of the selected class.

When a resource sends an acceptance message to the requestor, it starts keeping time for interval T2. If it has not received a confirmation or cancellation message from the requestor by the end of interval T2, it resends the acceptance message to the requestor. It keeps resending the acceptance message at intervals T2 until it receives a confirmation or cancellation message. Upon receipt of a cancellation message, the resource may switch to another task or accept a request from another requestor. The length of interval T2 is not critical. It should be long enough that the IPC system is not flooded with unnecessary retransmitted acceptance messages. On the other hand, it should be short enough that the resource is not tied up too long waiting for a requestor that has ignored its previous acceptance message.

Note that neither request nor confirmation/cancellation broadcast message need be received by all resources belonging to the class to which they are addressed. The protocol guarantees correct operation even if a broadcast message is not received by any resource.

After sending a confirmation/cancellation broadcast message, the requestor starts keeping time for interval T3. During the interval, the requestor ignores further acceptance messages from resources under the assumption that these messages were sent before the resources interpreted the confirmation/cancellation broadcast message. After interval T3, the requestor sends a confirmation or cancellation message directly (not a broadcast message) to any resource from which it receives an acceptance message. Interval T3 is not critical. It should be long enough that most acceptance messages generated by resources before the confirmation/cancellation broadcast message is received by them are ignored, but short enough that the resources that did not receive the original confirmation/cancellation message are not kept waiting too long. A cancellation message must be sent by the requestor within a reasonable time of receipt of any acceptance message, no matter when it arrives, so that the resource is not kept waiting too long. This is a significant constraint on the requestor, since acceptance messages may arrive from a previously busy resource even after the requestor has finished its present task and has started another one.

While the invention has been particularly shown and described with references to a preferred embodiment thereof, it will be understood by those skilled in the art that the foregoing and other changes in form and details may be made therein without departing from the spirit and scope of the invention.

Having thus described our invention, what we claim as new and desire to secure by Letters Patent is:

1. In a communication system including one or more requestors and one or more responders each representing a resource useable by the requestors, apparatus for establishing a message transmitting connection between a requestor and a responder in accordance with a protocol of signal transmissions between the requestors and responders, including, in combination:
    signal conveying means for transmitting signals in accordance with the protocol;
    a requestor protocol interface connecting said signal conveying means to each requestor;
    a responder protocol interface connecting said signal conveying means to each resource;
    said requestor protocol interface including;
    means for transmitting a request for resource use signal;
    means for receiving and storing responder acceptance signals;
    means responsive to said means for receiving responder acceptance signals, for transmitting a confirmation signal to a responder, and for transmitting a request cancellation signal;
    said responder protocol interface including;
    means for receiving and storing a request for resource use signal;
    conditional means, responsive to said means for receiving a request signal, for transmitting an acceptance signal;
    means for indicating the associated resource is committed for use by a requestor;
    means for receiving a confirmation signal;
    means for receiving a request cancellation signal; and
    means, connecting said means for indicating, and said means for receiving a request cancellation signal, to said conditional means, for controlling the ability of the responder to transmit an acceptance signal.

2. A communication system in accordance with claim 1, wherein:
    said requestor protocol interface further includes;
    means for transmitting a particular resource identifying signal designating a particular resource and a particular requestor identifying signal identifying a particular requestor transmitting the request signal;
    said means for receiving and storing a request for resource use signal includes;
    means, responsive to a predetermined particular resource identifying signal designating a predetermined resource, for storing the signal identifying said particular requestor in said storing means;
    said conditional means for transmitting an acceptance signal includes;
    means for transmitting signals identifying said particular requestor and said predetermined particular resource;
    said means for receiving a confirmation signal, and said means for receiving a request cancellation signal, each include;
    means, responsive to said predetermined particular resource identifying signal and said particular requestor signal corresponding to said particular requestor signal stored in said storing means.

3. A communication system in accordance with claim 2 wherein:
    said means for transmitting a particular resource identifying signal includes;
    means for transmitting a class identifying signal, which class includes a plurality of individual resources, or alternatively an individual identifying signal for a predetermined one of said individual resources;
    said means for transmitting a request signal includes means for selecting said means for transmitting a class identifying signal, or said individual identifying signal;
    said means for receiving and storing a request signal includes means responsive to predetermined ones of either said class identifying signal or said individual identifying signal associated with the attached resource;
    said conditional means for transmitting an acceptance signal includes means for transmitting said predetermined individual identifying signal;
    said means, responsive to said means for receiving responder acceptance signals for transmitting a confirmation signal, includes means for selecting said means for transmitting said individual identifying signal of said predetermined resource; and
    said means for receiving said confirmation signal includes means responsive to said predetermined individual identifying signal.

4. A communication system in accordance with claim 3 wherein:
    said means responsive to said means for receiving responder acceptance signals for transmitting said request cancellation signal includes;
    means, operative in response to receipt of an acceptance signal for transmitting said class identifying signal and said request cancellation signal.

5. A communication system in accordance with claim 3 wherein:
    said means responsive to said means for receiving responder acceptance signals for transmitting said request cancellation signal includes;
    first means, operative in response to receipt of an acceptance signal from only one of said individual resources, for inhibiting transmission of said cancellation signal; and second means, operative in response to receipt of an acceptance signal from a plurality of said individual resources included in a class, for transmitting a like plurality of cancellation signals and individual identifying signals of said resources other than said predetermined individual resource.

6. A communication system in accordance with claim 1, wherein:

said requestor protocol interface and said responder protocol interface each include;

message serial number storage;

means associated with said means for transmitting a request signal and said conditional means for transmitting an acceptance signal each including means for transmitting the contents of said message serial number storage, and comparing means associated with said means responsive to said means for receiving responder acceptance signals in said requestor protocol interface, and connected to said message serial number storage for inhibiting transmission of a confirmation signal in the absence of equality with the message serial number received with the acceptance signal.

* * * * *